(12) United States Patent
Smith et al.

(10) Patent No.: US 12,045,649 B1
(45) Date of Patent: Jul. 23, 2024

(54) APPARATUS AND METHOD FOR TASK ALLOCATION

(71) Applicant: Strategic Coach, Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/142,670

(22) Filed: May 3, 2023

(51) Int. Cl.
*G06F 9/48* (2006.01)
*G06F 9/50* (2006.01)
*G06N 3/049* (2023.01)

(52) U.S. Cl.
CPC .............. *G06F 9/4887* (2013.01); *G06F 9/48* (2013.01); *G06F 9/4806* (2013.01); *G06F 9/4843* (2013.01); *G06F 9/485* (2013.01); *G06F 9/4856* (2013.01); *G06F 9/4881* (2013.01); *G06F 9/50* (2013.01); *G06F 9/5005* (2013.01); *G06F 9/5027* (2013.01); *G06F 9/5038* (2013.01); *G06F 9/5083* (2013.01); *G06F 9/5088* (2013.01); *G06N 3/049* (2013.01)

(58) Field of Classification Search
CPC ........ G06F 9/50; G06F 9/5005; G06F 9/5027; G06F 9/5038; G06F 9/5083; G06F 9/5088; G06F 9/48; G06F 9/4806; G06F 9/4843; G06F 9/485; G06F 9/4856; G06F 9/4881; G06F 9/4887
See application file for complete search history.

(56) References Cited

U.S. PATENT DOCUMENTS

| | | | |
|---|---|---|---|
| 8,819,374 B1 * | 8/2014 | Don | G06F 3/0647 711/112 |
| 9,705,633 B2 * | 7/2017 | Godavarti | H04J 99/00 |
| 10,871,988 B1 * | 12/2020 | Gao | G06F 9/505 |
| 11,252,149 B1 * | 2/2022 | Bang | G06F 3/167 |
| 2006/0026261 A1 * | 2/2006 | Allday | G06F 9/5055 709/217 |
| 2014/0173150 A1 * | 6/2014 | Yu | G06F 1/3203 710/267 |
| 2016/0098292 A1 * | 4/2016 | Boutin | G06F 9/4881 718/104 |
| 2018/0255122 A1 * | 9/2018 | Hu | G06F 9/445 |
| 2018/0321980 A1 * | 11/2018 | Lo | G06N 7/01 |
| 2020/0334567 A1 * | 10/2020 | Bhattacharjee | H04L 67/125 |
| 2020/0364646 A1 | 11/2020 | Arar | |
| 2021/0011759 A1 * | 1/2021 | Park | G06F 11/3024 |
| 2022/0092516 A1 | 3/2022 | Hunter | |
| 2022/0270021 A1 | 8/2022 | Glocker | |
| 2023/0214734 A1 * | 7/2023 | Jacob | G06F 3/0486 705/7.14 |

\* cited by examiner

*Primary Examiner* — Charles M Swift
(74) *Attorney, Agent, or Firm* — Caldwell Intellectual Property Law

(57) ABSTRACT

An apparatus and method. The apparatus including at least a processor configured to identify a plurality of tasks associated with a first resource, determine at least an assignable task of the plurality of tasks and reallocate the at least an assignable task that includes: identifying a plurality of second resources, wherein each resource includes an efficiency index corresponding to the at least an assignable task and a temporal attribute, generating an optimal reallocation as a function of the efficiency index and the temporal attribute and reallocating the at least an assignable task as a function of the optimal reallocation.

20 Claims, 9 Drawing Sheets

700

Identifying a Plurality of Tasks associated with a First Resource — 705

Determining at least an Assignable Task — 710

Reallocating at least an Assignable Task — 715

APPARATUS AND METHOD FOR TASK ALLOCATION

FIELD OF THE INVENTION

The present invention generally relates to the field of machine learning. In particular, the present invention is directed to an apparatus and method for personalized task allocation.

BACKGROUND

Modeling efficiency of real-world tasks is an elusive challenge for computer systems, due to the many variables and degrees of uncertainty involved.

SUMMARY OF THE DISCLOSURE

In an aspect an apparatus for personalized task allocation that includes a processor configured to: identify a plurality of tasks associated with a first resource, wherein identifying the plurality of tasks further includes generating a completion time constraint for each task from the plurality of tasks and determining a projected completion time for each task from the plurality of tasks. The processor further configured to determine at least an assignable task of the plurality of tasks, wherein determining the at least an assignable task includes identifying a time deficit for each task from the plurality of tasks, wherein identifying the time deficit comprises comparing completion time constraint to the projected completion time for each task of the plurality of tasks; and determining the at least an assignable task as a function of the time deficit and a threshold function. The processor further configured to reallocate the at least an assignable task, wherein reallocating further includes identifying a plurality of second resources, wherein each resource includes an efficiency index corresponding to the at least an assignable task and a temporal attribute, generating an optimal reallocation as a function of the efficiency index and the temporal attribute and reallocating the at least an assignable task as a function of the optimal reallocation.

In another aspect a method for personalized task allocation. The method including identifying a plurality of tasks associated with a first resource, wherein identifying the plurality of tasks further includes: generating a completion time constraint for each task from the plurality of tasks and determining a projected completion time for each task from the plurality of tasks. The method also including determining at least an assignable task, wherein determining the at least an assignable task includes identifying a time deficit for each task from the plurality of tasks, wherein identifying the time deficit comprises comparing the completion time constraint to the projected completion time for each task of the plurality of tasks and determining the at least an assignable task as a function of the time deficit and a threshold function. The method also including reallocating, by the at least a processor, the at least an assignable task, wherein reallocating further includes: identifying a plurality of second resources, wherein each resource includes an efficiency index corresponding to the at least an assignable task and a temporal attribute, generating an optimal reallocation as a function of the efficiency index and the temporal attribute and reallocating the at least an assignable task as a function of the optimal reallocation.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and method for personalized task allocation. In an embodiment, tasked identified as assignable are allocated a candidate based on the proximity to user.

Aspects of the present disclosure allow for assignment of tasks based on machine learning. Exemplary embodiments illustrating aspects of the present disclosure are described below in the context of several specific examples.

Figure 1:
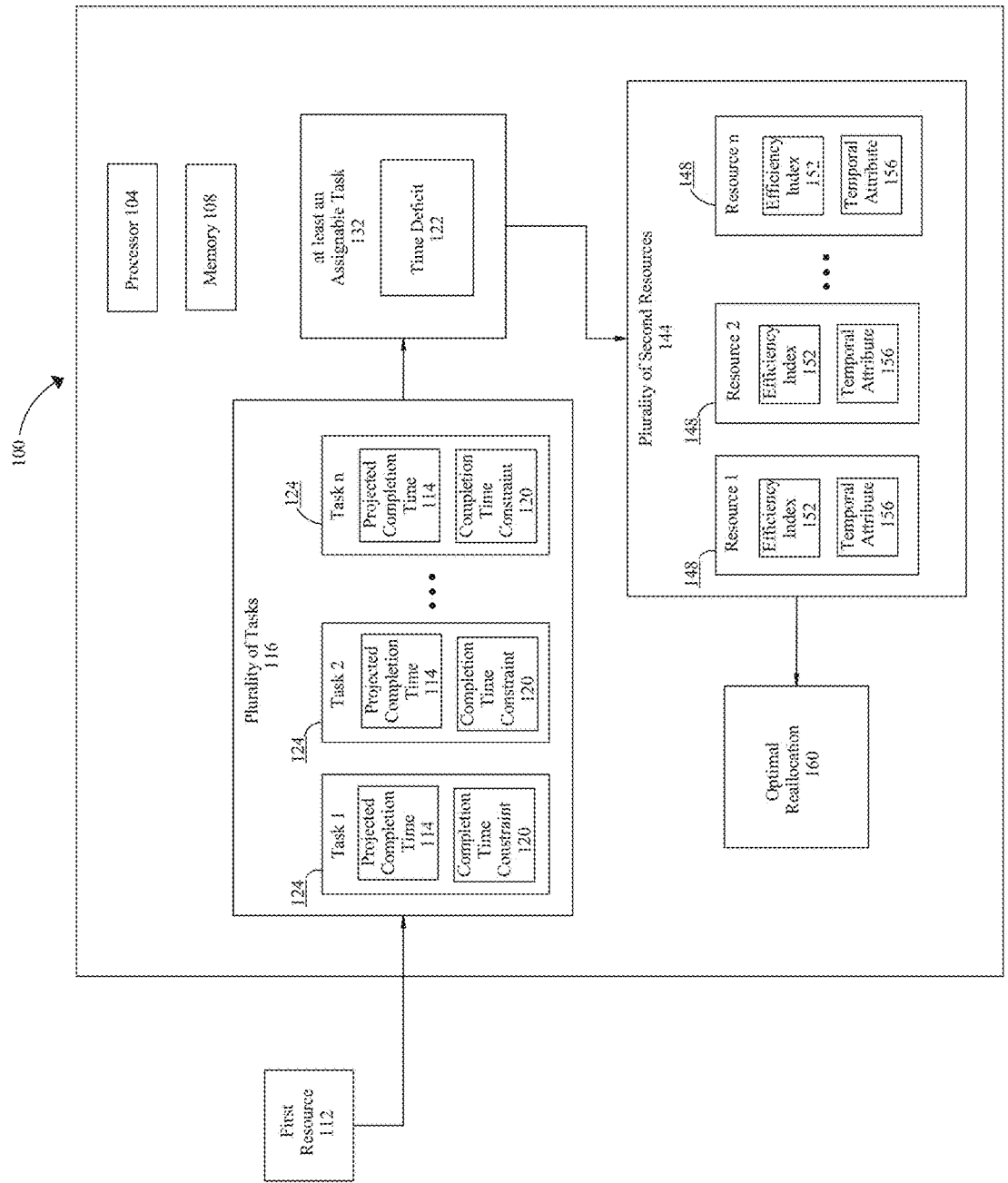
FIG. 1 is a block diagram of an exemplary embodiment of an apparatus for personalized task allocation.

Referring now to FIG. 1, an exemplary embodiment of an apparatus 100 for personalized task allocation is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Processor 104 or at least a processor 104 are used interchangeably throughout this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or processor 104.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, apparatus 100 includes a memory 108 communicatively connected to the at least a processor 104, wherein the memory 108 contains instructions configuring processor 104 to perform tasks in accordance with this disclosure. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Continuing to refer to FIG. 1, in some embodiments, memory 108 contains instructions configuring processor 104 to receive a first resource 112. A "first resource," as used herein, is data that contains descriptions of actions. In an embodiment, first resource 106 may be a user profile. A "user profile," as used herein, is at least an element of data describing the user in some aspect. In a nonlimiting example, first resource 112 may be free-form text generated by a user that includes some descriptions of a user's habits and tasks performed on a day-to-day basis. A "free-form text," as used herein, are texts generated by a user without any formal constraints. An example, without limitations, is a short paragraph written by a user that describes the user in his or her own words. In some embodiments, user profile may be received from a profile database. A "profile database," as used herein, is a data structure configured to store user profile. Profile database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in an embodiment, user profile may include at least a location datum. A "location datum," as used herein, is a geographical location associated with a user. In some embodiments, location datum may be the geographical location of a user's address. In an embodiment, location datum may be inputted by user. In embodiments, location datum may include location where user may perform tasks. In a nonlimiting example, location datum may be inputted by user as their preferred location. In another nonlimiting example, location datum may include geographical location of interest to the user, such as a pet shop where user brings his or her dog for grooming on a regular basis. In some embodiments, user profile may be received from a user. In some embodiments, user profile may be received as a function of a user filling out a form. In further embodiments, form may include an online form. In other embodiments, form may be a physical form. In an embodiment, processor may be further configured to extract text from a physical form. In an embodiment, extracting text may include using an optical character reader (OCR). In a nonlimiting example, a user may fill out a form with information about themselves, such as using a pen to fill out a paper form, and processor 104 may extract text from the physical form using OCR. In a further nonlimiting example, processor 104 may be further configured to store extracted text in profile database.

With continued reference to FIG. 1, in an embodiment, processor 104 may be configured to receive user profile as a function of an automatic speech recognition. In a nonlimiting example, a user may dictate to a computing device the contents of the user profile, such as answering some preset questions related to the user's habits. In some embodiments, automatic speech recognition may require training (i.e., enrollment). In some cases, training an automatic speech recognition model may require an individual speaker to read text or isolated vocabulary. In some cases, a solicitation video may include an audio component having an audible verbal content, the contents of which are known a priori by processor 104. Processor 104 may then train an automatic speech recognition model according to training data which includes audible verbal content correlated to known content. In this way, processor 104 may analyze a person's specific voice and train an automatic speech recognition model to the person's speech, resulting in increased accuracy. Processor 104 may be communicatively connected to a computing device. Alternatively or additionally, in some cases, computing device may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, processor 104 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow computing device 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 3-6. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks(TDNN's) may be used for automatic speech recognition, for example over longer time intervals for continuous speech recognition.

Continuing to refer to FIG. 1, in an embodiment, user profile may be received as a function of an interaction between an user and a chatbot. A "user," as used herein, is a person, or entity, that utilizes apparatus 100. As used in the current disclosure, a "chatbot" is a computer program designed to simulate conversation with a user. Chatbot is described in more detail in FIG. 2.

Still referring to FIG. 1, in an embodiment, processor 104 is configured to identify a plurality of tasks 116 associated with first resource 112. In some embodiments, identifying plurality of tasks 116 may include generating a completion time constraint 120 for each task 124 from plurality of tasks 116. A "completion time constraint," as used herein, is a default amount of time for completion of a task. Default amount of time may be received from a database. In embodiments, processor 104 may further include determining a projected completion time 128 for each task 124 from the plurality of tasks 116. A "projected completion time," as used herein, is an estimation of how long a task will take to be completed. In some embodiments, projected completion time 128 may be stored in a database. In some embodiments, processor 104 may determine projected completion time 128 for a task 124 by querying a database, where the database includes completion time constraints 120 for other users and/or for personnel. In an embodiment, processor 104 may determine projected completion time 128 for a task 124 based on a plurality of queried completion time constraints 120. In a nonlimiting example, processor 104 may query a database for completion time for a task, where the task may have different completion times for each personnel in the database. In this nonlimiting example, processor 104 may be configured to determine projected completion time 128 by averaging the different completion times received. It will be apparent to one of ordinary skill, upon reading this disclosure, of the many methodologies that can be used to ascertain a projected completion time 128 for a task 116.

With continued reference to FIG. 1, in an embodiment, processor 104 is further configured to determine at least an assignable task 132. An "assignable task," as used herein, is a task 116 that can be performed by another individual other than the user. In some embodiments, determining at least an assignable task 132 may include identifying a time deficit 136 for each task 116 from plurality of tasks 116, wherein identifying time deficit 136 includes comparing completion time constraint 120 to projected completion time 128 for each task 116 from plurality of tasks 116. A "time deficit," as used herein, is the additional time difference between projected completion time 128 and completion time constraint 120 of that task. In an embodiment, time deficit may be identified by subtracting completion time constraint 120 from projected completion time 128. It will be apparent to someone of ordinary skill in the art, upon reading this disclosure, the many methodologies that can be used for identifying time deficit 136.

Continuing to refer to FIG. 1, in an embodiment, determining at least an assignable task 136 may include ranking each task 116 from plurality of tasks 116 as a function of time deficit 136. In some embodiments, processor 104 may use a scoring function for ranking plurality of tasks 116. In an example, without limitations, processor 104 may assign scores based on time deficit, where the higher the time deficit 136 the lower the score. In an embodiment, processor 104 may determine only the task 116 with the highest time deficit 136 as at least an assignable task 132. Ranking and scoring algorithms are discussed in more detail further below.

Still referring to FIG. 1, in an embodiment, determining at least an assignable task 136 may include determining at least an assignable task 136 may include as a function of time deficit 136 and a threshold function 140. A "threshold function," as a used herein, is a set threshold related to the completion time of a task. In some embodiments, processor 104 may determine assignable tasks for all tasks with a time deficit above a set threshold. In a nonlimiting example, set threshold may be a set of minutes, such as a threshold of 20 mins. In a further nonlimiting example, processor 104 may determine all tasks with a time deficit 136 of 20 minutes or more as assignable tasks.

Still referring to FIG. 1, in an embodiment, processor 104 is further configured to reallocate at least an assignable task 132. In embodiments, reallocating at least an assignable task 132 may include identifying a plurality of second resources 144, wherein each resource 148 from the plurality of second resources 144 includes an efficiency index 152 corresponding to at least an assignable task 132 and a temporal attribute 156. An "efficiency index," is a score related to how well a person performs a task. In some embodiments, efficiency index 152 may correspond to an unique ability attribute. An "unique ability attribute," as used herein, is a measurement of how suited a person is for the task. In some embodiments, unique ability attribute may be how much a person enjoys performing that type of task. In a nonlimiting example, a person that enjoys performing a task may be more efficient than someone that does not enjoy that type of task. In another embodiment, unique ability attribute may be how the task relates to a person's profession or hobby. In a nonlimiting example, a person that works as a window cleaner will likely be more suited for a window cleaning task than a person that works as a food delivery driver. Efficiency index 152 may be calculated using a machine learning model. A "temporal attribute," as used herein, is a measurement of time related to a set maximum amount of time for completing a task. In an embodiment, temporal attribute 156 may be how quickly a person takes to accomplish a task. Temporal attribute may be determined using a machine learning model. Machine learning models are described in more detail in reference to FIGS. 3-6. A unique ability attribute may include, without limitation, an outlier cluster as identified and/or described in U.S. Nonprovisional Application Ser. No. 18/141,296, filed on Apr. 28, 2023 and entitled "SYSTEMS AND METHODS FOR DATA STRUCTURE GENERATION," the entirety of which is incorporated by reference herein.

Still referring to FIG. 1, identifying a unique attribute cluster may include identifying a plurality of attribute clusters. An "attribute cluster" is a plurality of related attributes of an entity. In non-limiting examples, an entity may include a person or a company. An attribute may include any or all of a feature, section, knowledge, asset, or skill of an entity. An attribute cluster may include a single attribute of the entity, or it may include more than one attribute. An attribute cluster may include multiple related attributes. In a non-limiting example, an attribute cluster may include knowledge of how to paint and an inventory of paintbrushes. In another non-limiting example, an attribute cluster may include knowledge of how to use several computer programs, each useful for an aspect of creating virtual artwork. In another non-limiting example, an attribute cluster may include knowledge of how to use a single computer program.

Still referring to FIG. 1, in some embodiments, apparatus 100 may determine an outlier cluster as a function of an impact metric. As used herein, an "outlier cluster" is an attribute cluster with an impact metric that differs substantially from a population average. In some embodiments, an outlier cluster represents a measure of skill or competence. In a non-limiting example, an outlier cluster may represent a function an entity is more skilled at than another entity or than an average entity. In some embodiments, an outlier cluster may represent an attribute that is particularly important to an entity's success in a target process, which may include the plurality of tasks as described herein. In a non-limiting example, an attribute cluster representing skill with certain computer programs may be an outlier cluster if a related impact metric suggests that it plays a much more important role in an entity's success than other entities with attribute clusters representing skill with those computer programs. In another non-limiting example, an attribute cluster representing fluency in a certain language may be an outlier cluster relative to a population of entities in the same industry if the entity does substantial work in a geography that primarily speaks that language, but the others do not. As used herein, an "impact metric" is a measure of the degree to which an attribute cluster supports a target process. In some embodiments, processor 104 may determine an impact metric using an impact metric machine learning model. In some embodiments, impact metric machine learning model may be trained on data sets including historical attribute clusters, and historical target processes, associated with ratings of the degree to which historical attribute clusters support the historical target processes. Such ratings may be obtained, in a non-limiting example, from average ratings of experts as to the degree to which these historical attribute clusters supported these historical target processes. Impact metric machine learning model may accept as inputs attribute clusters and target processes and may output impact metric.

With continued reference to FIG. 1, in an embodiment, reallocating at least an assignable task 132 may include generating an optimal reallocation 160 as a function of efficiency index 152 and temporal attribute 156. An "optimal reallocation," as used herein, is a resource option that provides an optimal reallocation. In an embodiment, reallocating at least an assignable task 132 may include reallocating at least an assignable task 132 as a function of optimal reallocation 160. In some embodiments, generating optimal reallocation 160 may include minimizing an objective function. An "objective function," as used in this disclosure, is a mathematical function with a solution set including a plurality of data elements to be compared, such as without limitation plurality of candidate task chain combinations. Objective function generates an output scoring candidate task chain combinations according to at least a goal criterion, which may include any criterion as described in further detail below. Processor 104 may compute a score, metric, ranking, or the like, associated with each resource 148 and select objectives to minimize and/or maximize the score, depending on whether an optimal result is represented, respectively, by a minimal and/or maximal score.

Continuing to refer to FIG. 1, in an embodiment, processor 104 may be configured to receive internal personnel assignment data from a personnel database. In an embodiment, internal personnel data assignment data may include at least a contractor correlated to at least a current role. A "contractor," as used herein, is an individual that is available for hire. It will be apparent to one of ordinary skill in the art, upon reading this disclosure, that a contractor is defined as a non-exclusive manner as to include any individual capable of performing tasks.

Still referring to FIG. 1, in some embodiments, processor 104 may be configured to determine internal personnel additional tasks. "Internal personnel additional tasks," as used herein, is a at least a task that is not explicitly listed in internal personnel data that has a high degree of similarity to a listed task. In a nonlimiting example, internal personnel additional task may be a task of "driving a limo" that is found to be closely associated with "driving a taxi." It will be apparent to one of ordinary skills in the art, upon reading this disclosure, of the many tasks that may be determined as additional tasks.

Continuing to refer to FIG. 1, in embodiments, determining internal personnel additional tasks may include identifying current roles for each contractor. A "current role," as used herein, is an aggregate of tasks that a contractor performs regularly. In a nonlimiting example, current role may include yard landscaping, which may include tasks such as raking, lawn mowing, and the like. In another nonlimiting example, current role may include dog walker, which may include tasks such as walking dogs, picking up dogs from user's residence and returning them, bringing a user's dog to the dog park, and the like. Associations between tasks 112 and current roles may be performed using a machine learning model. Associations between tasks 112 and current roles may be performed using any algorithm and/or methodology described in reference to FIGS. 3-6. It will become apparent to a person of ordinary skill in the art, upon reading this disclosure, the many tasks that may be associated with roles and that two or more roles may have overlapping tasks associated with them.

With continued reference to FIG. 1, in an embodiment, determining internal personnel additional tasks may include generating tasks 116 similar to current tasks. In an embodiment, a task similar to current task may include tasks related to the same role. In a nonlimiting example, a task of "sweeping the floor" may be generated based on its similarity to a current task of "mopping the floor" as both tasks are related to the role of "floor cleaning." Processor 104 may be configured to generate task 116 similar to current task using a classifier. Generating task 116 similar to current task may be performed according to any methodology described throughout this disclosure, including disclosure in reference to FIGS. 3-6.

Continuing to refer to FIG. 1, processor 104, in an embodiment, may be further configured to receive posting data. "Posting data," as used herein, is any information made publicly accessible on the internet by a user. Posting data may include data posted on a social media website, such as Instagram, owned by Meta Corp., located at 1 Hacker Way, Menlo Park, CA 94025. A "post," as used herein, are texts and/or images that are made available to other users of a website. In an embodiment, processor 104 may be configured to receive posting data using a WebCrawler. A "WebCrawler," as used herein, is a computer program configured to search and index content from the internet. In a nonlimiting example, processor 104 may use WebCrawler to search for users located near a location datum included in user profile. In a further nonlimiting example, processor 104 may receive a location datum that is inside Town A and search for postings from persons within Town A. In an embodiment, processor 104 may be configured to store posting data in a database. In a further embodiment, processor 104 may be further configured to store posting data in a NoSQL database. It will become apparent to a person with ordinary skill in the art, upon reading this disclosure, of the many ways that posting data can be gathered from the internet.

Still referring to FIG. 1, in an embodiment, processor may be configured to determine external personnel data as a function of posting data. In some embodiments, processor 104 may determine external personnel data using OCR. In some embodiments, optical character recognition or optical character reader (OCR) includes automatic conversion of images of written (e.g., typed, handwritten or printed text) into machine-encoded text. In some cases, recognition of at least a keyword from an image component, such as a posting from posting data, may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 3-6. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 3-6.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in an embodiment, processor 104 is configured to generate a personnel list as a function of internal personnel assignment data and the external personnel assignment data. In some embodiments, processor 104 may be configured to generate a list that include all elements of internal personnel assignment data and all elements of external personnel assignment data. In an embodiment, processor 104 may be configured to store only unique elements of internal personnel assignment data and external personnel assignment data, wherein storing unique elements include comparing the elements of internal personnel assignment data and external personnel assignment data. In some embodiments, personnel list may be stored in a database. Database may include any database disclosed throughout this disclosure.

Continuing to refer to FIG. 1, processor 104 may be configured to generate at least a personnel assignment for the assignable task as a function of personnel list. In some embodiments, processor 104 may be configured to rank all items of personnel list and generate at least a personnel assignment based on that ranking. In a nonlimiting example, processor 104 may rank elements of personnel list based on their proximity to location datum. In another nonlimiting example, processor 104 may be configured to rank elements from internal personnel data with a higher ranking than elements from external personnel assignment data, as contractors from internal database may be seeing as more reliable by a user.

Still referring to FIG. 1, processor 104 is further configured to transmit at least a personnel assignment to a user device. A "user device," as used herein, is a computing device capable of displaying information. In an embodiment, user device is a computing device configured to display a graphical user interface (GUI). In some embodiments, user device may be configured to interact with the user through the chatbot. In some embodiments, user device may be configured to receive a user's audio recording. User device may include any computing device described throughout this disclosure.

Continuing to refer to FIG. 1, in an embodiment, tasks 124 similar to current tasks may be generated as a function of a task assignment machine learning model. As used in this disclosure, "task assignment machine learning model" is a mathematical and/or algorithmic representation between input and outputs. Task assignment machine learning model may be implemented in any manner described in this disclosure regarding implementing and/or training machine learning models. Inputs to the machine learning model may include, as a non-limiting example, internal personnel assignment data, external personnel assignment data, tasks 112, and the like. Machine learning models and algorithms are described in more detail in reference to FIGS. 3-6.

Still referring to FIG. 1, in some embodiments, generating similar tasks 116 may include generating tasks training data. In some embodiments, processor 104 may be configured to determine external personnel additional tasks as a function of task assignment machine learning model. In embodiments, processor 104 may be configured to train assignment machine learning model 148 using the tasks training data. Generating tasks training data may include correlating internal personnel data and/or external personnel data to previously generated tasks 116 from a plurality of tasks 116. In some embodiments, training data may include correlations of internal personnel data and/or external personnel data to tasks 124 from a plurality of tasks 116 generated for other users. In other embodiments, tasks training data may include correlations of internal personnel data and/or external personnel data to tasks 124 from a plurality of tasks 116 previously generated for the current user. Training data is described in more detail in reference to FIGS. 3-6.

Still referring to FIG. 1, in one embodiment, determining external personnel assignment data may include using a language model. A "language model," as used herein, is a machine learning model configured to generate associations between words and their meanings. In an example, without limitations, language model may be configured to generate associations between actions described by a user and tasks associated with those actions. In a further example, language model may be used to identify associations between tasks and roles associated with a user, such as a user that posts about working as a "pool cleaner" and the task of "pool cleaning." Machine learning, including language model, is discussed in more detail in reference to FIGS. 3-6.

Figure 2:
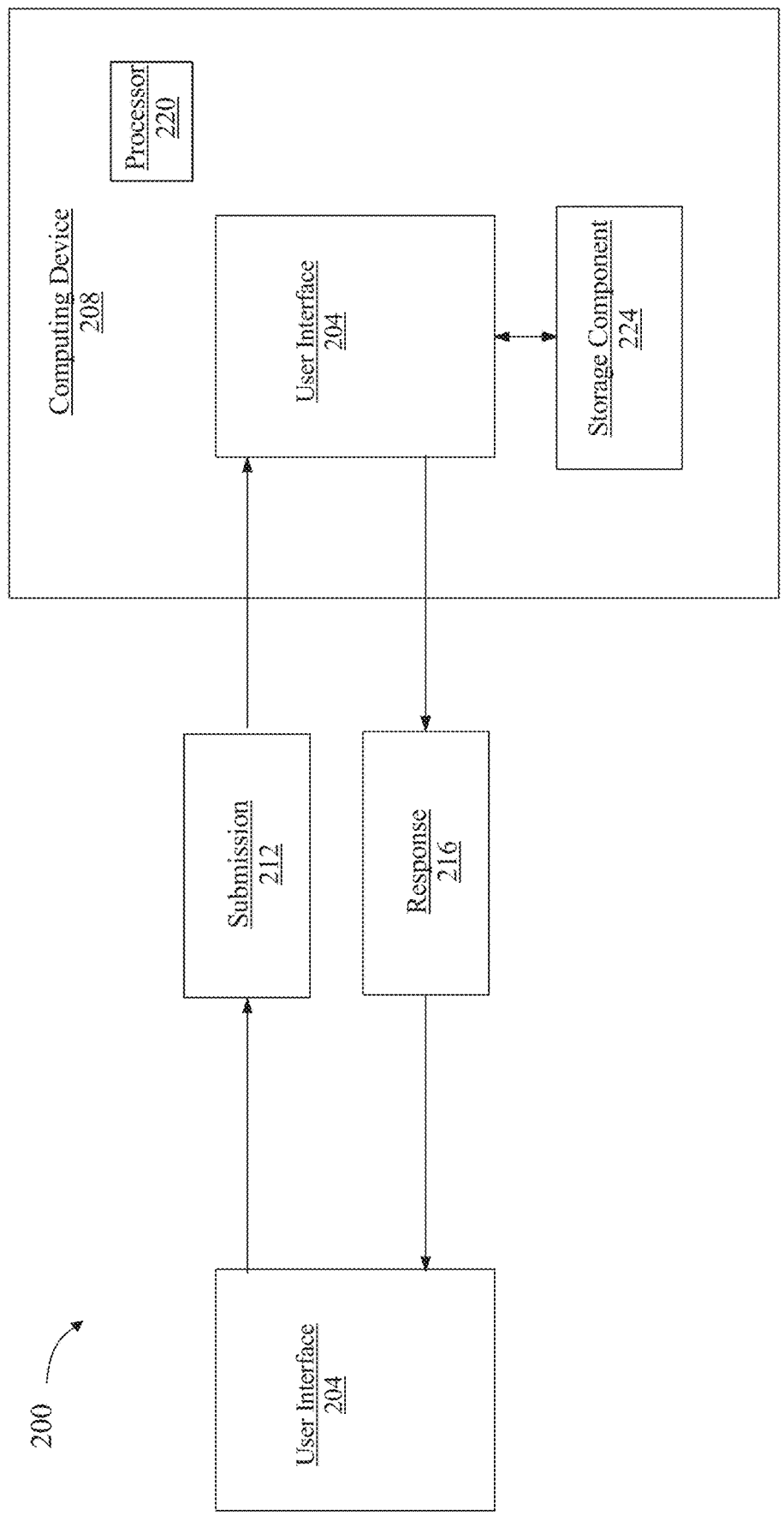
FIG. 2 illustrates an exemplary embodiment of a chatbot.

Now referring to FIG. 2, an illustrative embodiment of a chatbot system 200 is presented. According to some embodiments, a user interface 204 may be communicative with a computing device 208 that is configured to operate a chatbot. In some cases, user interface 204 may be local to computing device 208. Alternatively or additionally, in some cases, user interface 204 may remote to computing device 208 and communicative with the computing device 208, by way of one or more networks, such as without limitation the internet. In some embodiments, computing device 208 may include user device 146. In embodiments, computing device 208 may be communicatively connected to processor 104. Alternatively or additionally, user interface 204 may communicate with computing device 208 using telephonic devices and networks, such as without limitation fax machines, short message service (SMS), or multimedia message service (MMS). Commonly, user interface 204 communicates with computing device 208 using text-based communication, for example without limitation using a character encoding protocol, such as American Standard for Information Interchange (ASCII). Typically, a user interface 204 conversationally interfaces a chatbot, by way of at least a submission 212, from the user interface 204 to the chatbot, and a response 216, from the chatbot to the user interface 204. In many cases, one or both of submission 212 and response 216 are text-based communication. Alternatively or additionally, in some cases, one or both of submission 212 and response 216 are audio-based communication.

Continuing in reference to FIG. 2, a submission 212 once received by computing device 208 operating a chatbot, may be processed by a processor 220. In some embodiments, processor 220 processes a submission 212 using one or more of keyword recognition, pattern matching, and natural language processing. In some embodiments, processor employs real-time learning with evolutionary algorithms. In some cases, processor 220 may retrieve a pre-prepared response from at least a storage component 224, based upon submission 212. Alternatively or additionally, in some embodiments, processor 220 communicates a response 216 without first receiving a submission 212, thereby initiating conversation. In some cases, processor 220 communicates an inquiry to user interface 204; and the processor is configured to process an answer to the inquiry in a following submission 212 from the user interface 204. In a nonlimiting example, an answer to an inquiry present within a submission 212 from user device 146 may be used by processor 104 as an input to another function, for example without limitation user profile 106.

Figure 3:
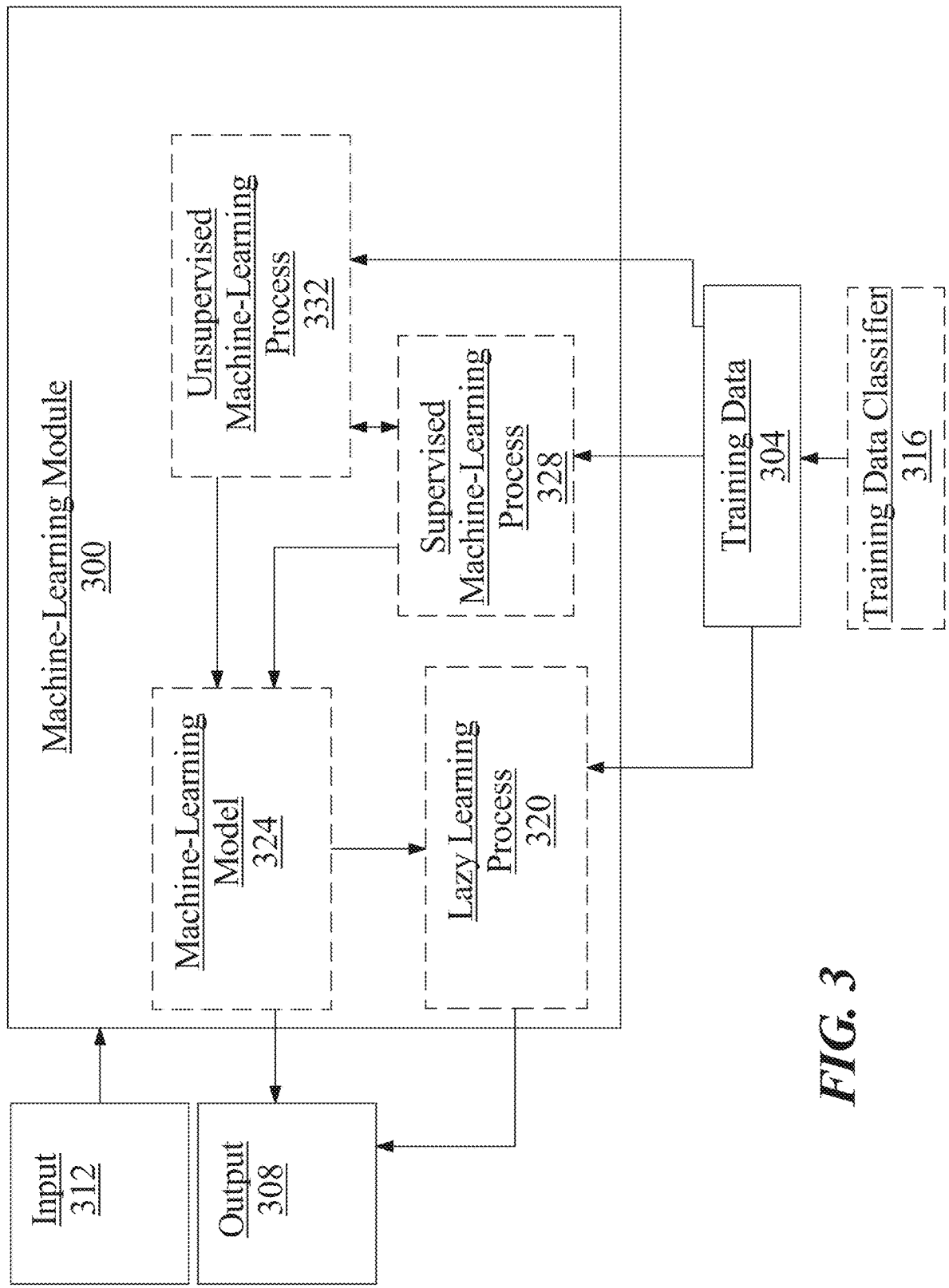
FIG. 3 is a block diagram of an exemplary embodiment of a machine learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, a task such as sweeping may be an input and a closely associated task, such as racking, may be an output.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to narrow tasks such as the sub-task of sweeping that includes gathering debris with dustpan with broom.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include tasks, such as "driving a work van," as described above as inputs, closely associated tasks, such as "driving a limo," as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 4:
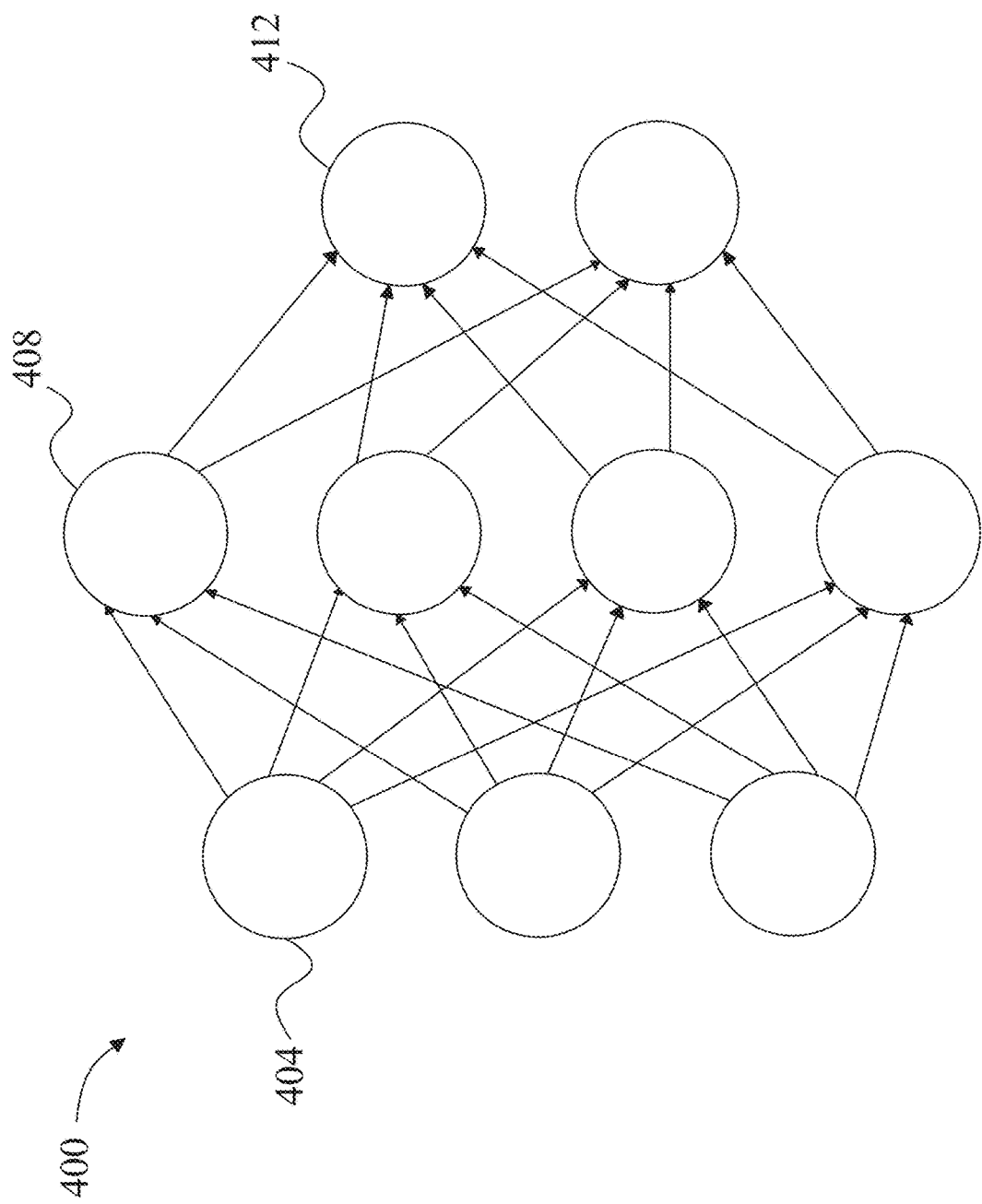
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
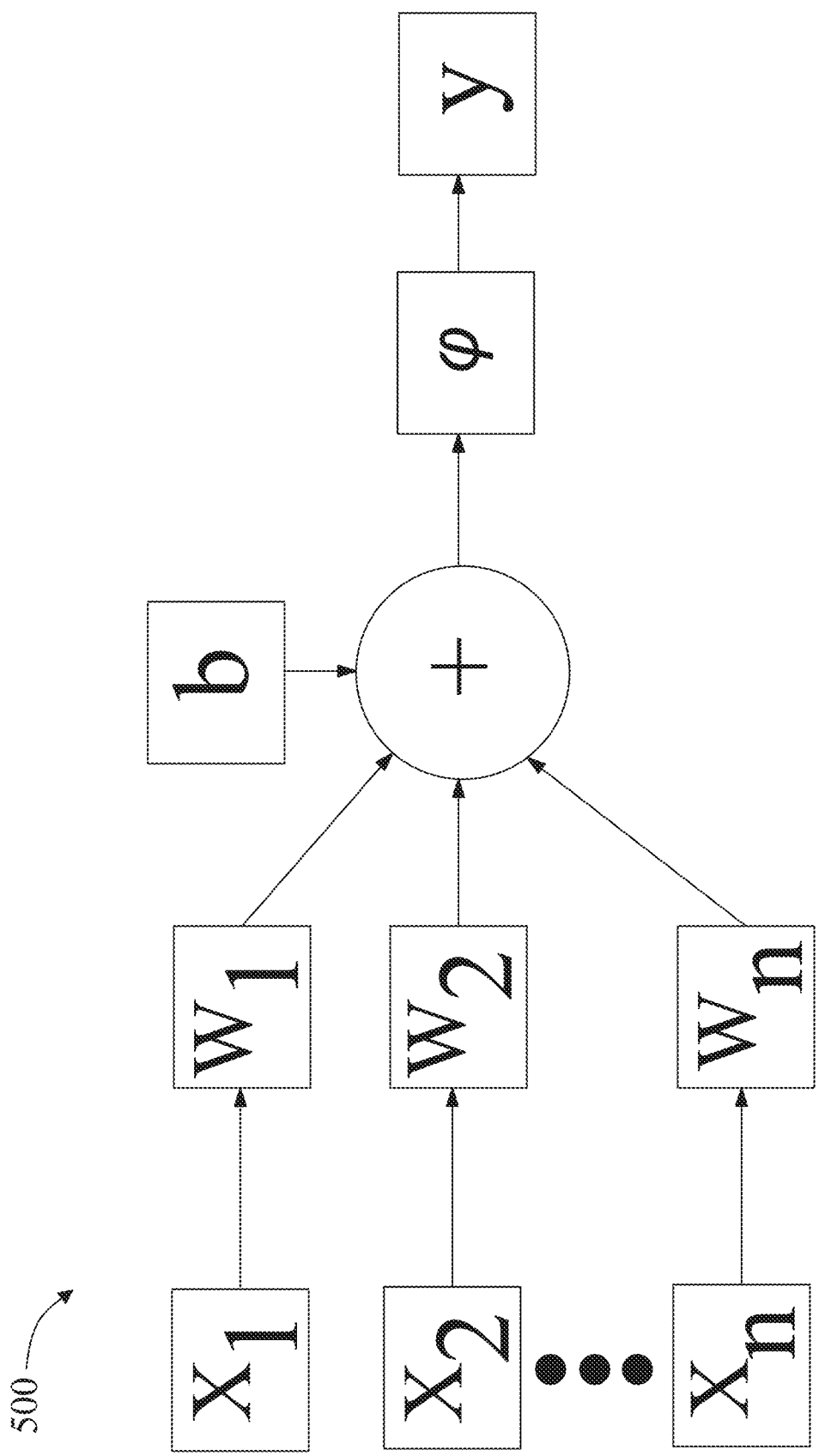
FIG. 5 is a diagram of an illustrative embodiment of a node of a neural network.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(\alpha x, x)$ for some $\alpha$, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
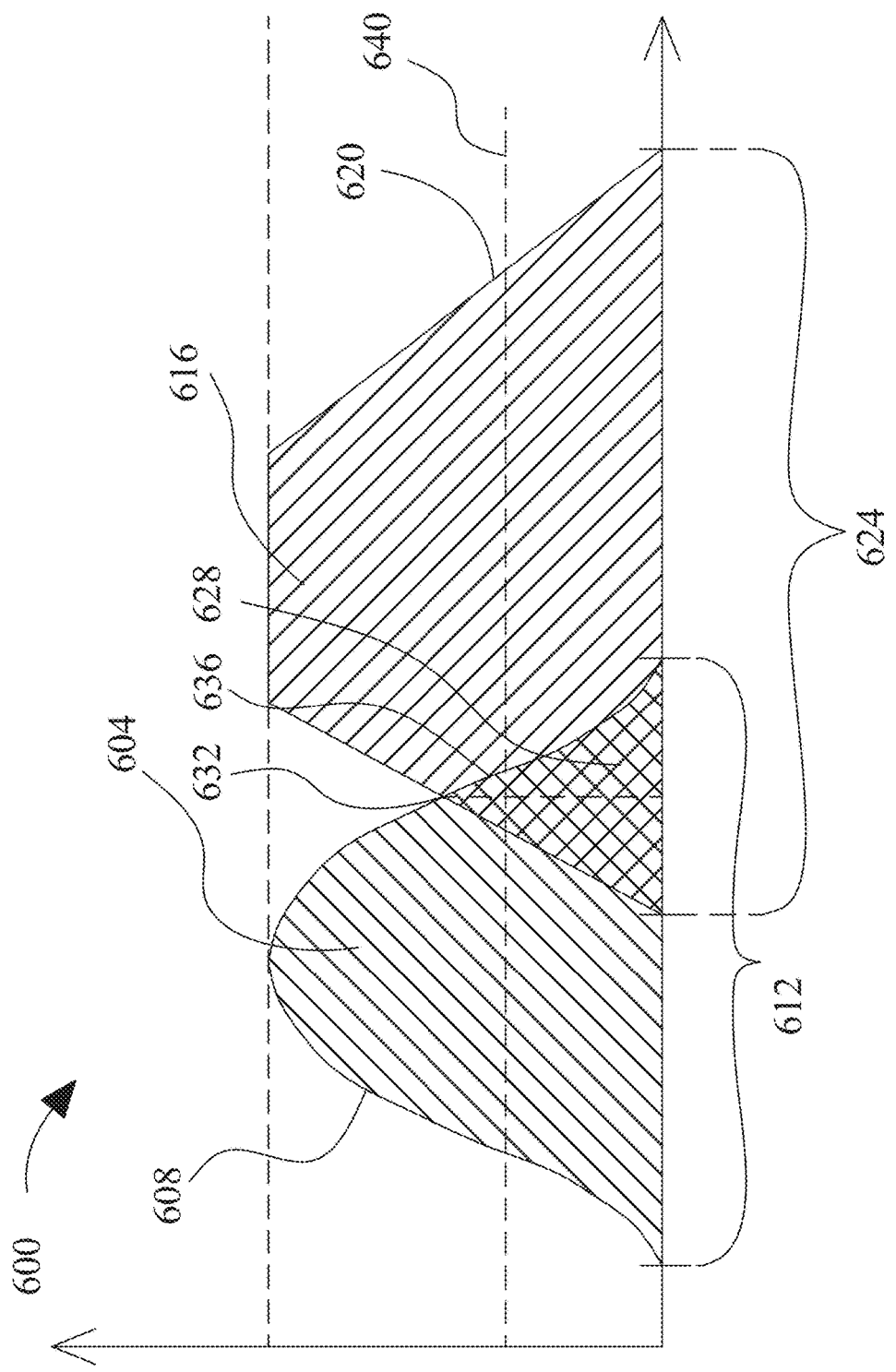
FIG. 6 is a graph illustrating an exemplary relationship between fuzzy sets.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or internal personnel assignment data 124, external personnel assignment data 140 such as without limitation tasks, current roles, current tasks, additional tasks, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify a task with a current role 132. For instance, if a task has a fuzzy set matching a task associated with a role fuzzy set by having a degree of overlap exceeding a threshold, processor 104 may classify the task as belonging to the current role. Where multiple fuzzy matches are performed, degrees of match for each respective fuzzy set may be computed and aggregated through, for instance, addition, averaging, or the like, to determine an overall degree of match.

Still referring to FIG. 6, in an embodiment, a task may be compared to multiple user state fuzzy sets. For instance, task may be represented by a fuzzy set that is compared to each of the multiple current role fuzzy sets; and a degree of overlap exceeding a threshold between the task fuzzy set and any of the multiple current role fuzzy sets may cause apparatus 102 to classify the task as belonging to a current role. For instance, in one embodiment there may be two current role fuzzy sets, representing respectively a gardening and a landscaping role. Gardening role may have a gardening fuzzy set; landscaping role may have a landscaping fuzzy set; and task may have a task fuzzy set. Processor 104, for example, may compare a task fuzzy set with each of gardening fuzzy set and landscaping fuzzy set, as described above, and classify a task to either, both, or neither of gardening or landscaping. Machine-learning methods as described throughout may, in a non-limiting example, generate coefficients used in fuzzy set equations as described above, such as without limitation x, c, and σ of a Gaussian set as described above, as outputs of machine-learning methods. Likewise, task may be used indirectly to determine a fuzzy set, as task fuzzy set may be derived from outputs of one or more machine-learning models that take the task directly or indirectly as inputs.

Figure 7:
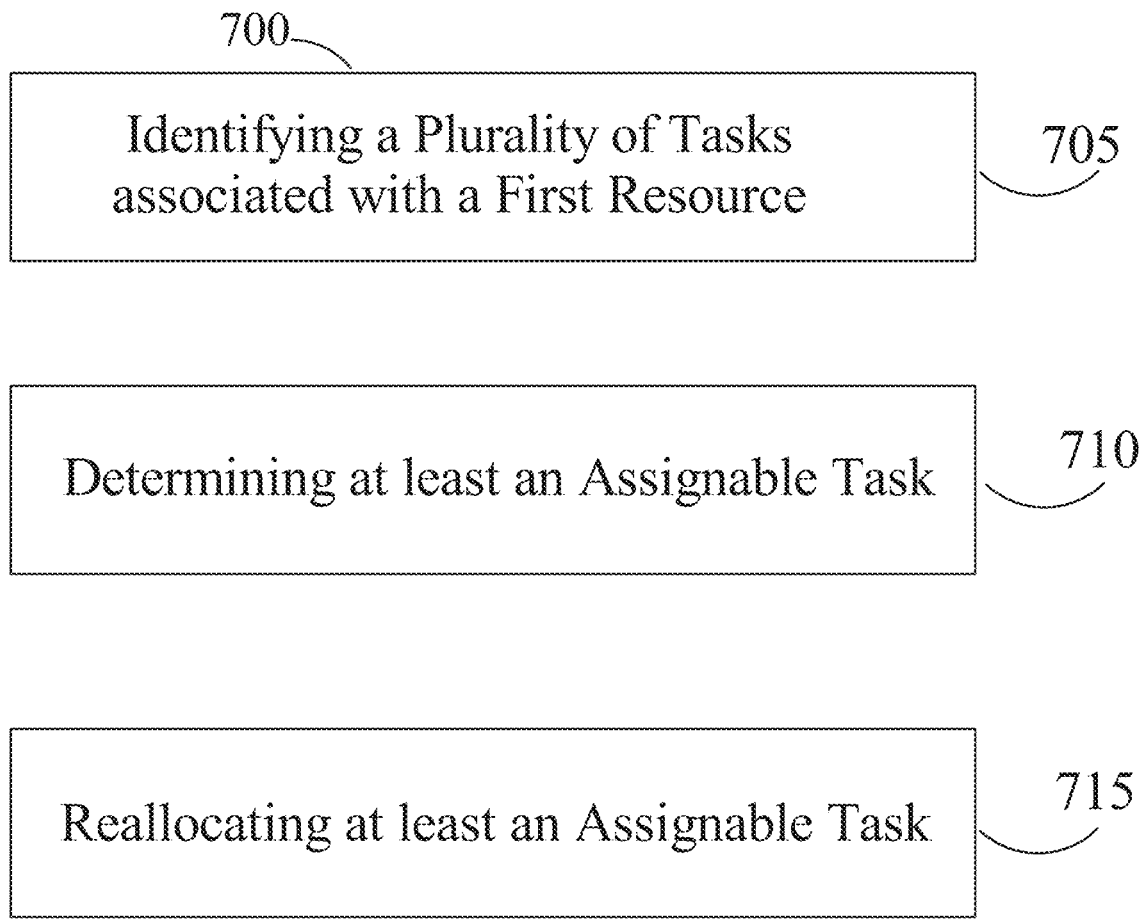
FIG. 7 is a flow diagram of an exemplary method for personalized task allocation.

Now referring to FIG. 7, method 700, at step 705, includes identifying, by processor 104, plurality of tasks 116 associated with first resource 112. In an embodiment, identifying plurality of tasks 116 may further include generating completion time constraint 120 for each task 124 from plurality of tasks 116. In some embodiments, identifying plurality of tasks 116 may further include determining projected completion time 128 for each task 124 from plurality of tasks 116. In some embodiments, method 700 may include receiving first resource 112. In embodiments, method 700 may include receiving first resource 112 using an optical character reader. In embodiments, method 700 may include receiving first resource 112 as a function of an interaction between a user and a chatbot. Method 700 may be performed according to any disclosure described in reference to FIGS. 1-6 and 8.

Still referring to FIG. 7, at step 710, method 700 includes determining, by processor 104, at least an assignable task 132. In an embodiment, determining at least an assignable task 132 may further include identifying time deficit 136 for each task 116 from plurality of tasks 116, wherein identifying time deficit 136 includes comparing completion time constraint 120 to projected completion time 128 for each task 116 of plurality of tasks 116. In a further embodiment, determining at least an assignable task 132 may further include determining at least an assignable task 132 as a function of time deficit and threshold function 140. Steps in method 700 may be performed according to descriptions in reference to FIGS. 1-6 and 8.

With continued reference to FIG. 7, at step 715, method 700 includes reallocating at least an assignable task 132. In embodiments, reallocating at least an assignable task 132 may include identifying plurality of second resources 144, wherein each resource 148 includes efficiency index 152 corresponding to at least an assignable task 132 and temporal attribute 156. In embodiments, reallocating at least an assignable task 132 may further include generating optimal reallocation 160 as a function of efficiency index 152 and temporal attribute 156. In embodiments, reallocating at least an assignable task 132 may include reallocating at least an assignable task 132 as a function of optimal reallocation 160. In embodiments, method 700 may include assigning a score to each resource 148 from plurality of second resources 144. In embodiments, each resource 148 from plurality of second resources 144 may be scored as a function of temporal attribute 156. In embodiments, method 700 may further include reallocating at least an assignable task 132 as a function of the scoring. In embodiments, method 700 may further include determining temporal attributes 156 using a machine learning model. In embodiments, machine learning model may be a neural network. Methods may be performed according to references to FIGS. 1-6 and 8.

Figure 8:
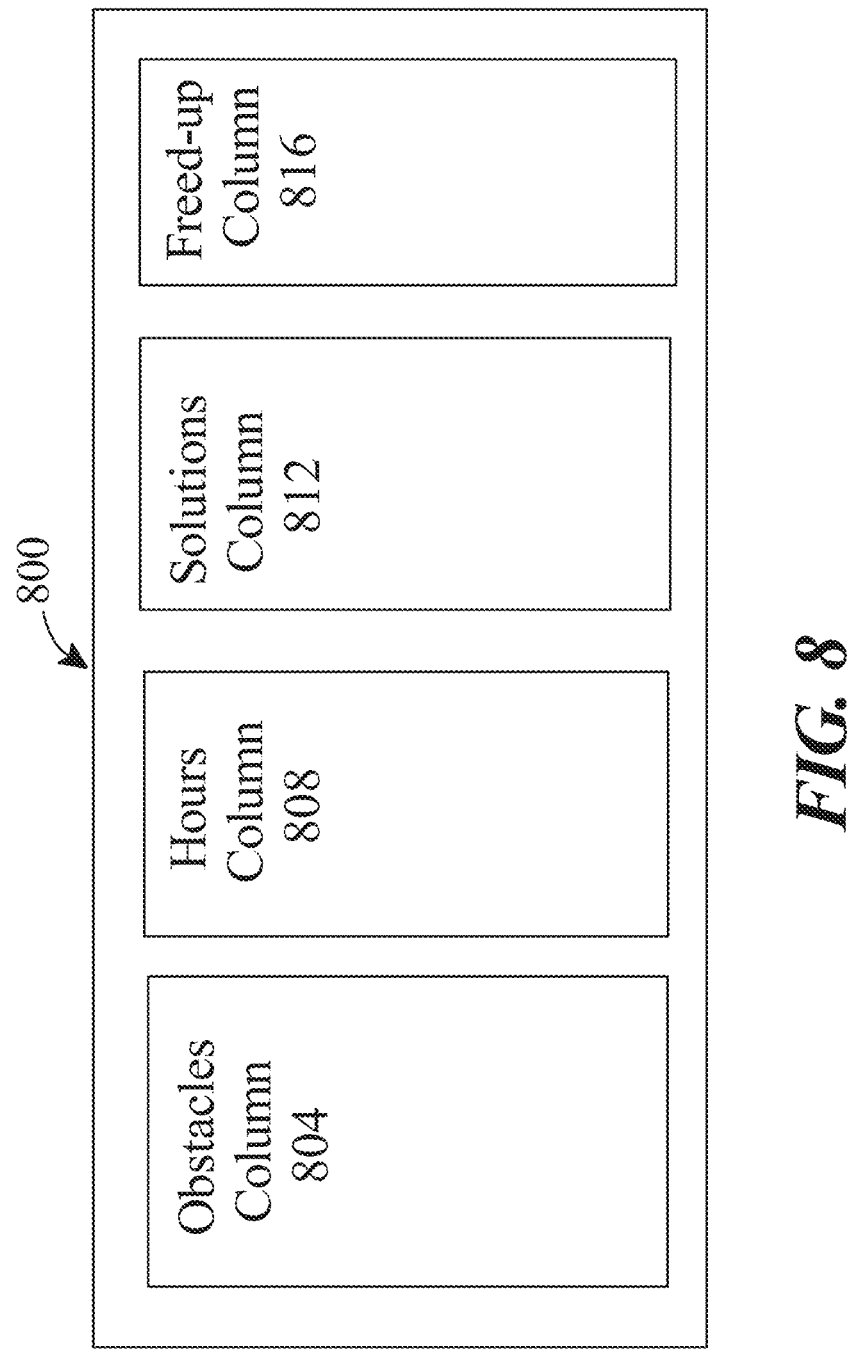
FIG. 8 is an exemplary embodiment of a user interface component.

Now referring to FIG. 8, an exemplary representation of a user interface component is presented. In an embodiment, user interface 800 may include an obstacles column 804, which may include a plurality of tasks 116. In an example, obstacle column 804 may include a plurality of tasks 116 that a user needs to accomplish. In an embodiment, user interface 800 may include an hours column 808, where each row contains the amount of time to complete a task. Each row in hours column 808 may be correlated to a task in obstacles column 804.

Continuing to refer to FIG. 8, in an embodiments user interface 800 may include a solutions 812 column, which may include plurality of secondary resources 144. In an example, without limitations, solutions column 812 may include a list of people that can performed a task described in obstacles column 804. In some embodiments, user interface 800 may include a freed-up column 816, which includes additional tasks that a user can performed once tasks in obstacles column 804 have been reallocated. In a nonlimiting example, freed-up column 816 may display a task of "attending pottery class," which is a desirable task by the user, that user is enabled to perform once a task of "doing taxes" has been reallocated to an individual listed in solutions column 812.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
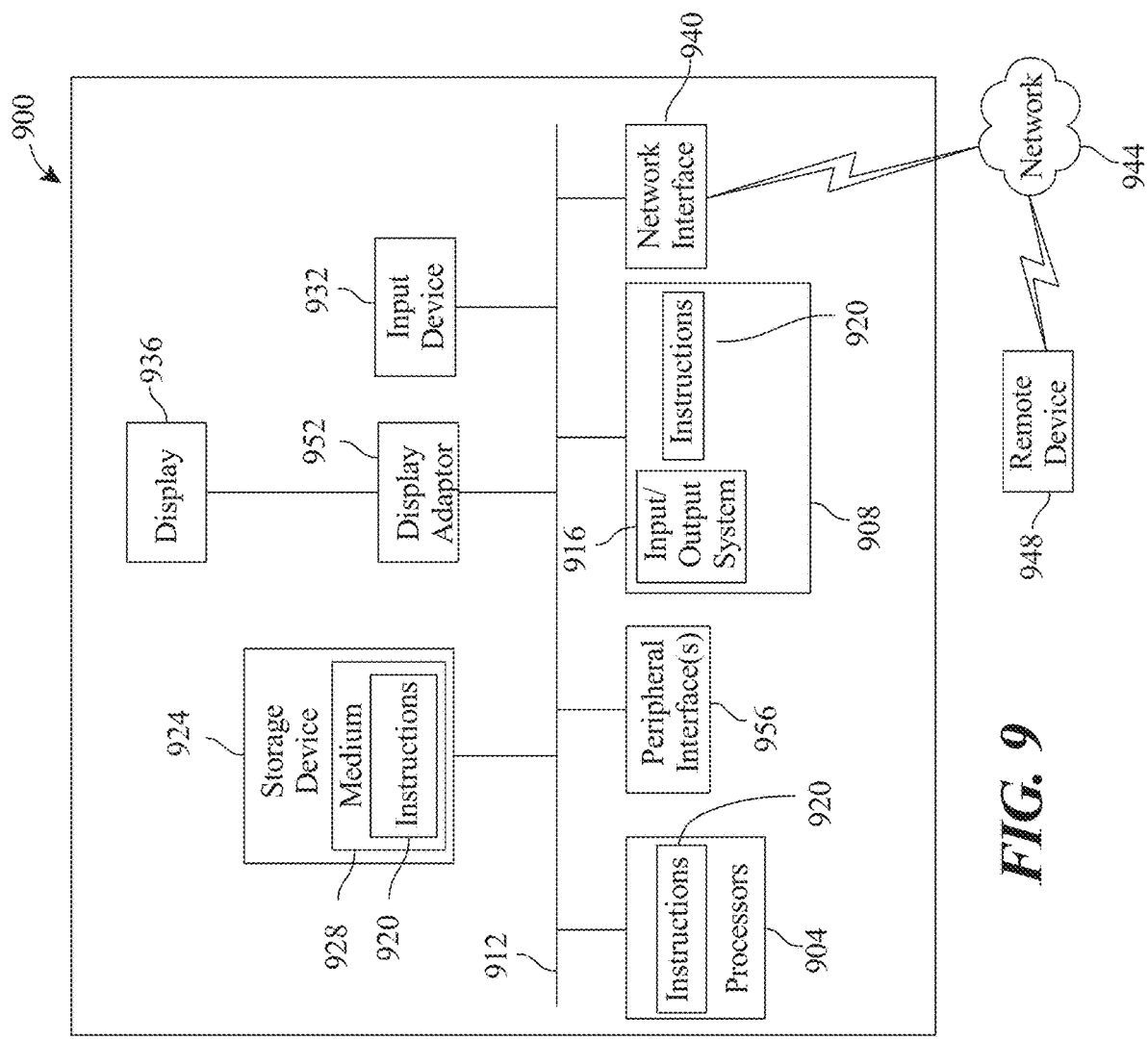
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for personalized task allocation, the apparatus comprising:
   at least a processor;
   a memory configuring the at least a processor to:
   identify a plurality of tasks associated with a first resource, wherein identifying the plurality of tasks further comprises:
      generating the plurality of tasks, wherein generating the plurality of tasks comprises:
         receiving tasks training data comprising a plurality of internal personnel data correlated to a plurality of the plurality of tasks;
         training a task assignment machine learning model as a function of the tasks training data; and
         generating the plurality of tasks as a function of the task assignment machine learning model;
      generating a completion time constraint for each task from the plurality of tasks; and
      determining a projected completion time for each task from the plurality of tasks;
   determine at least an assignable task of the plurality of tasks, wherein determining the at least an assignable task comprises:
      identifying a time deficit for each task from the plurality of tasks, wherein identifying the time deficit comprises comparing completion time constraint to the projected completion time for each task of the plurality of tasks;
      ranking each task of the plurality of tasks as a function of the time deficit; and
      determining the at least an assignable task as a function of the time deficit and a threshold function wherein the at least an assignable task comprises a task of the plurality of tasks with a highest ranked time deficit; and
   reallocate the at least an assignable task, wherein reallocating further comprises:
      identifying a unique ability attribute for each second resource of a plurality of second resources by:
         identifying a plurality of attribute clusters; and
         locating, in the plurality of attribute clusters, an outlier cluster as the unique ability attribute;
      identifying the plurality of second resources, wherein each resource includes an efficiency index corresponding to the at least an assignable task, unique ability attribute, and a temporal attribute;
      generating an optimal reallocation as a function of the efficiency index and the temporal attribute; and
      reallocating the at least an assignable task as a function of the optimal reallocation.

2. The apparatus of claim 1, wherein the processor is further configured to assign a score to each resource from the plurality of secondary resources.

3. The apparatus of claim 2, wherein each resource from the plurality of secondary resources is scored as a function of the temporal attribute.

4. The apparatus of claim 3, wherein the processor is further configured to relocate the at least an assignable task as a function of the scoring.

5. The apparatus of claim 1, wherein the at least a processor is configured to determine temporal attribute using a machine learning model.

6. The apparatus of claim 5, wherein the machine learning model is a neural network.

7. The apparatus of claim 1, wherein the processor is further configured to receive the first resource.

8. The apparatus of claim 7, wherein the at least a processor is configured to receive the first resource using an optical character reader.

9. The apparatus of claim 7, wherein the processor is further configured to receive the first resource as a function of an interaction between a user and a chatbot.

10. The apparatus of claim 9, wherein processor is communicatively connected to a user device, wherein the user device comprises the chatbot.

11. A method for personalized task allocation, the method comprising:
identifying, by the at least a processor, a plurality of tasks associated with a first resource, wherein identifying the plurality of tasks further comprises:
generating the plurality of tasks, wherein generating the plurality of tasks comprises:
receiving tasks training data comprising a plurality of internal personnel data correlated to a plurality of the plurality of tasks;
training a task assignment machine learning model as a function of the tasks training data; and
generating the plurality of tasks as a function of the task assignment machine learning model;
generating a completion time constraint for each task from the plurality of tasks; and
determining a projected completion time for each task from the plurality of tasks;
determining, by the at least a processor, at least an assignable task, wherein determining the at least an assignable task comprises:
identifying a time deficit for each task from the plurality of tasks, wherein identifying the time deficit comprises comparing the completion time constraint to the projected completion time for each task of the plurality of tasks; and
ranking each task of the plurality of tasks as a function of the time deficit determining the at least an assignable task as a function of the time deficit and a threshold function wherein the at least an assignable task comprises a task of the plurality of tasks with a highest ranked time deficit;
reallocating, by the at least a processor, the at least an assignable task, wherein reallocating further comprises:
identifying a unique ability attribute for each second resource of a plurality of second resources by:
identifying a plurality of attribute clusters; and
locating, in the plurality of attribute clusters, an outlier cluster as the unique ability attribute;
identifying the plurality of second resources, wherein each resource includes an efficiency index corresponding to the at least an assignable task, unique ability attribute, and a temporal attribute;
generating an optimal reallocation as a function of the efficiency index and the temporal attribute; and
reallocating the at least an assignable task as a function of the optimal reallocation.

12. The method of claim 11, wherein the method further comprises assigning a score to each resource from the plurality of secondary resources.

13. The method of claim 12, wherein each resource from the plurality of secondary resources is scored as a function of the temporal attribute.

14. The method of claim 12, wherein the method further comprises reallocating the at least an assignable task as a function of the scoring.

15. The method of claim 11, wherein the method further comprises determining the temporal attribute using a machine learning model.

16. The method of claim 15, wherein the machine learning model is a neural network.

17. The method of claim 11, wherein the method further comprises receiving the first resource.

18. The method of claim 17, wherein the method further comprises receiving the first resource using an optical character reader.

19. The method of claim 17, wherein the method further comprises receiving the first resource as a function of an interaction between a user and a chatbot.

20. The method of claim 19, wherein the at least a processor is communicatively connected to a user device, wherein the user device comprises the chatbot.

* * * * *